Figure 1:
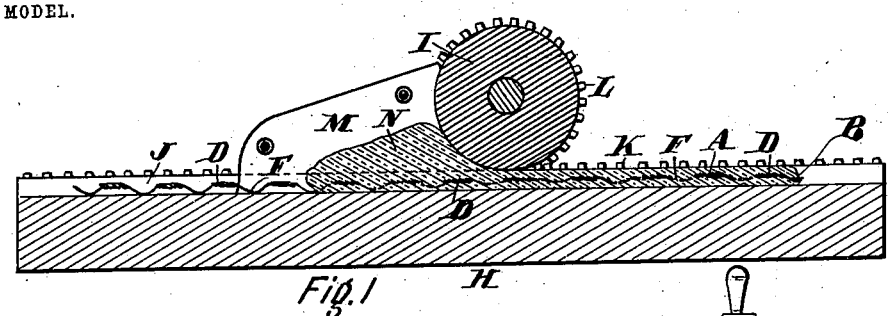

No. 727,006. PATENTED MAY 5, 1903.
F. & A. SHUMAN.
METHOD OF MANUFACTURING WIRE GLASS.
APPLICATION FILED JUNE 14, 1902.
NO MODEL.

Attest
R. M. Kelly
E. Gall

Inventors
Frank Shuman and
Arno Shuman
By their atty.

No. 727,006. Patented May 5, 1903.

UNITED STATES PATENT OFFICE.

FRANK SHUMAN AND ARNO SHUMAN, OF PHILADELPHIA, PENNSYLVANIA, ASSIGNORS TO THE CONTINUOUS GLASS PRESS COMPANY, OF PHILADELPHIA, PENNSYLVANIA, A CORPORATION OF NEW JERSEY.

METHOD OF MANUFACTURING WIRE-GLASS.

SPECIFICATION forming part of Letters Patent No. 727,006, dated May 5, 1903.

Application filed June 14, 1902. Serial No. 111,746. (No specimens.)

*To all whom it may concern:*

Be it known that we, FRANK SHUMAN and ARNO SHUMAN, of the city and county of Philadelphia, State of Pennsylvania, have invented an Improvement in Methods of Manufacturing Wire-Glass, of which the following is a specification.

Our invention has reference to a method for manufacturing wire-glass; and it consists of certain improvements fully set forth in the following specification and shown in the accompanying drawings, which form a part thereof.

Heretofore it has been customary in the manufacture of wire-glass to roll the glass upon a smooth table and while doing so force a meshed wire by mechanical means down from above and into the fused glass. The meshed wire was in a flat condition and its position within the body of the glass plate was dependent upon the extent to which it was forced or positively depressed during the rolling operation. That process required complicated devices embodying two rolls, one of which forced the meshed wire down into the upper surface of the molten glass and the other rolled the glass smooth and over the embedded wire. The objection to that process was twofold, namely: It produced a double rolling of the hardening mass. The second rolling disturbed the preliminary skin formed by the first rolling and rendered the glass brittle and weak, and, secondly, the wire being in flat form did not allow for any relative variation in expansion and contraction with respect to the glass, and hence under severe changes of temperature the glass was caused to crack, this result being especially liable in view of the weakened form of the outer skin or surface layer of glass, as above pointed out.

The object of our invention is to so produce a sheet of wire-glass as to overcome the above objections, and this we accomplish by an improved process involving only a single rolling operation and the introduction of the meshed wire in such a manner and in such form or shape that it shall always in the finished glass have capacity for the compensation necessary for relative variation of expansion between the wire and glass.

In carrying out our invention we roll the molten glass upon a flat surface, the excess of glass being pushed forward during the rolling operation, and this rolling of the glass is made to take place over a specially-prepared meshed wire or layer of metal which is placed upon the flat surface preliminary to the rolling operation. The meshed-wire layer is made with bent parts which act to support the main body of the metal above the surface of the support, and hence presents a metallic meshed structure through which the molten glass may freely flow under the action of gravity and the propelling action of the rolling operation. The molten glass renders the bent portions of the meshed wire very hot and ductile, and while this is taking place the forward movement of the mass of the glass bodily stretches the wire in such manner as to cause the bent portions to straighten somewhat, whereby they clear the supporting-surface upon which the rolling is taking place and become surrounded on the bottom by the molten glass, which quickly enters the space thus made. When the glass is then subjected to the rolling operation, the meshed wire will have been wholly surrounded with glass in sheet form. The meshed wire will, moreover, have a more or less sinuous or wavy appearance. The twisted-wire portions will be near the middle of the glass, and the curved portions connecting them in whole or in part will project somewhat to one side of the said twisted portions and toward the lower surface of the sheet of glass. This sinuous form of the wire enables the unequal expansion of the wire and glass to be more or less compensated for and the avoidance of cracking of the glass from this cause assured.

Our invention will be better understood by reference to the accompanying drawings, in which—

Figure 2:
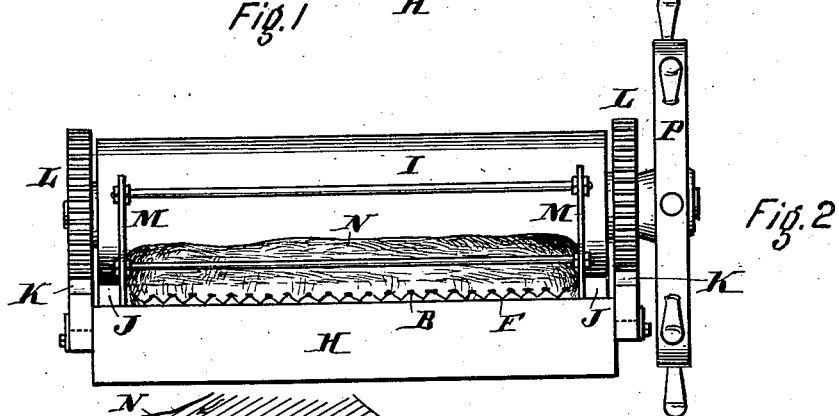
Figure 3:
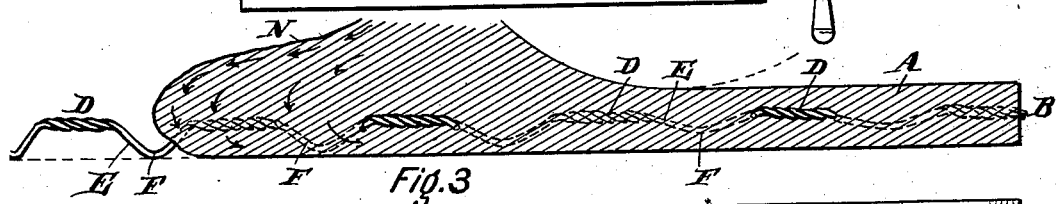
Figure 4:
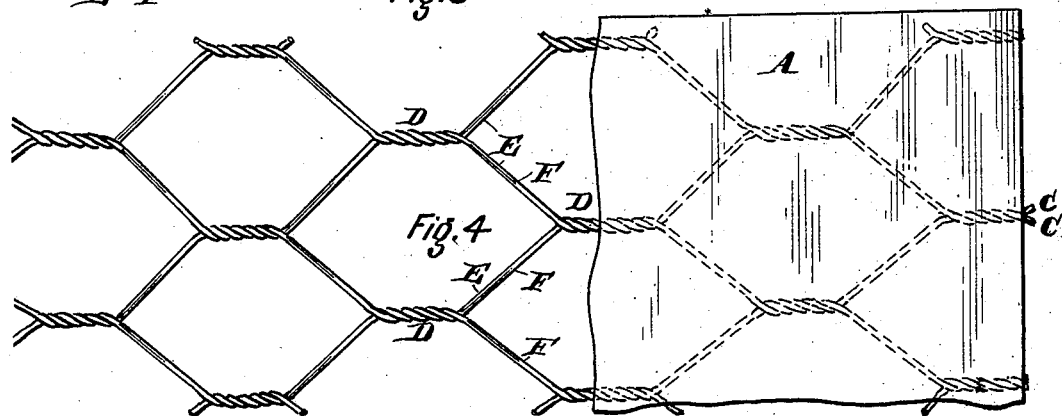
Figure 5:
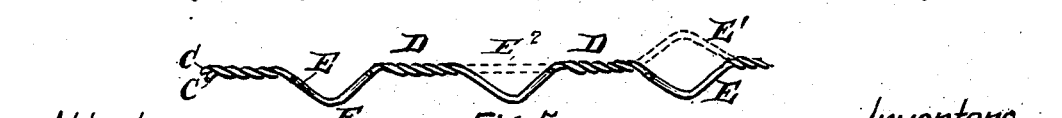

Figure 1 is a longitudinal sectional elevation of a machine suitable for carrying into practice our improved method. Fig. 2 is a front elevation of same. Fig. 3 is a longitudinal section of a portion of the wire-glass and shows a part of the meshed wire before being covered with the glass. Fig. 4 is a plan view of same, and Fig. 5 is a side elevation of a modified form of the meshed wire.

H is a smooth table, of metal, upon which the sheet of glass A is rolled by the roller I, also of metal and polished on its surface. The shaft of this roller has gear-wheels L, which mesh with racks K on the sides of the table H for positively propelling the roller over the table while rotating. A hand-wheel P may be employed to rotate the roller I. The roller I runs upon guide-strips J, the thickness of which regulates the thickness of the sheet of glass to be rolled.

M is a shoe which consists of two side plates connected by rods. This shoe rests upon the table H and is pushed along by the advancing roller I. The function of the shoe is to confine the glass laterally, and thereby limit the width of the sheet. N represents the glass in the ball or mass and molten condition, whereas A represents the rolled sheet of glass with the meshed wire B incorporated with it. The meshed wire B is composed of a series of wires C, twisted together at intervals, as at D, and spread so as to form open meshes connected by diagonal wires E. The twisted portions D lie in approximately the same plane, and the connecting-wires E are bent or curved downward, so as to form feet or supports by which to sustain the meshed wire above the surface of the table H. After these curved portions A have been acted on by the hot glass and thereby heated and stretched they are less curved, as indicated at F, and in this case the glass beneath the wire acts to support it.

The operation will now be understood. The meshed wire being made as described and resting upon the table and the ball of molten glass N being poured on the table close to the end, the roller I is put into motion. The glass, pushed forward by the roller I, flows through the meshes and heats the curved parts E of the wire. As the roller I advances it presses down the glass upon the wire to form the beginning of the sheet. The advancing roller pushes the molten mass of glass bodily forward, and this action stretches the heated meshed wire and more or less straightens the bent or curved portions E thereof until they assume the shape F within the glass and cause the wire to be wholly surrounded by the glass.

While in practice we have found it best to have all of the bent portions E on one side of the plane of the twisted portions D, nevertheless some of said curved portions may extend upon the other side, (upward,) as shown at E' in Fig. 5. It is also evident that the same general result would be secured if a portion of these connecting-wires were straight, as shown at $E^2$ in Fig. 5, as there would still be sufficient curved portions to act in the manner specified. The meshed wire or metal layer may be made in any way desired, provided it has supporting portions and is made extensible by stretching with capacity for raising the supporting portions within the glass under said stretching operation.

In this application we make no claims to the article of wire-glass nor to the structure of the meshed wire, as they form subject-matter of other applications, Serial Nos. 111,745 and 111,744, of even date with this.

Having now described our invention, what we claim as new, and desire to secure by Letters Patent, is—

1. The herein-described method of manufacturing wire-glass consisting in supporting a meshed-wire layer slightly above a hard surface by extensions from said meshed wire, rolling molten glass over said meshed wire and thus allowing it to flow through the meshes and around the supporting portions to form a support for the meshed wire and heating the same, then continuing the rolling of the mass of molten glass over the meshed wire and moving the excess of the molten glass in advance of the roller, stretching the meshed wire by the moving mass of molten glass so as to draw up the supporting portions of the meshed wire into the body of the glass, and completing the operation by continuing the rolling of the glass to bring it to definite thickness after the meshed wire has been raised clear of the hard surface.

2. The method of making wire-glass which consists in supporting a meshed wire partly upon and partly above a hard surface, applying molten glass upon the meshed wire so as to surround and heat it adjacent to the glass, rolling the glass so as to move the mass of the glass forward while the meshed wire remains stationary, stretching the heated meshed wire by the moving molten glass so as to raise the lower part of the meshed wire into the glass and permit the glass to flow under it, and subjecting the glass and meshed wire to pressure to compact them and bring the sheet of glass to the required thickness.

3. The method of making wire-glass which consists in supporting a meshed wire, surrounding the meshed wire with molten glass to heat it, forcing the mass of the glass forward and stretching the meshed wire to reduce the thickness of its structure so as to occupy less vertical thickness within the glass and finally rolling the glass and stretched meshed wire into a solid sheet.

4. In the art of manufacturing wire-glass, making a meshed wire of abnormal thickness, surrounding the meshed wire on all sides but the bottom by molten glass, forcing the mass of the glass forward to gradually cover all portions of the wire and at the same time stretching the meshed wire to reduce its thickness and thereby cause its bottom portion to be drawn up into the mass of molten glass, and rolling the glass into close contact with the meshed wire whereby it completely covers the wire on both top and bottom and is brought to the required thickness.

In testimony of which invention we have hereunto set our hands.

FRANK SHUMAN.
ARNO SHUMAN.

Witnesses:
R. M. HUNTER,
R. M. KELLY.